Oct. 27, 1925.

C. L. SAMS

HEADLIGHT REFLECTOR

Filed March 20, 1924

1,559,185

Inventor
C. L. Sams,
By
Attorney

Patented Oct. 27, 1925.

1,559,185

UNITED STATES PATENT OFFICE.

CHARLES L. SAMS, OF BRIDGEPORT, OHIO, ASSIGNOR OF ONE-HALF TO HENRY C. CILLES, JR., OF BRIDGEPORT, OHIO.

HEADLIGHT REFLECTOR.

Application filed March 20, 1924. Serial No. 700,650.

*To all whom it may concern:*

Be it known that I, CHARLES L. SAMS, a citizen of the United States, residing at Bridgeport, in the county of Belmont and State of Ohio, have invented certain new and useful Improvements in Headlight Reflectors; and I do hereby declare the following to be a full, clear, and exact description of the invention, such as will enable others skilled in the art to which it appertains to make and use the same.

The invention has relation to headlights for motor vehicles and has for its object to provide a headlight which illuminates the roadway in advance of the vehicle to render travel safe after dark, but which will not blind the driver of a vehicle approaching in the opposite direction.

In accordance with the present invention a reflector of the usual parabolic type is provided, the same having the upper forward portion curved downwardly to provide a guard or shield which intercepts the upwardly deflected rays of light and prevents the blinding of the driver of a vehicle approaching from the opposite direction.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the spirit of the invention.

Referring to the accompanying drawings forming a part of the application:

Corresponding and like parts are referred to in the following description and designated in both views of the drawings by like reference characters.

Figure 1:
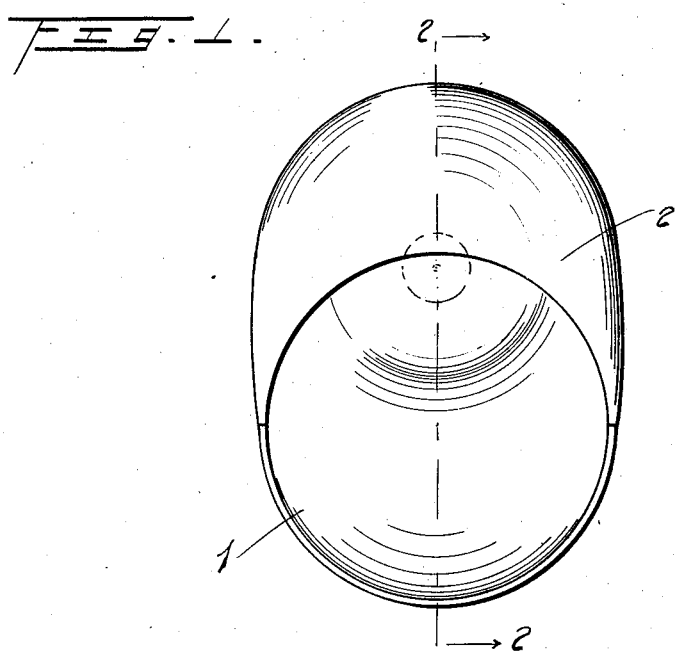
Figure 1 is a front view of a headlight reflector embodying the invention.
Figure 2:
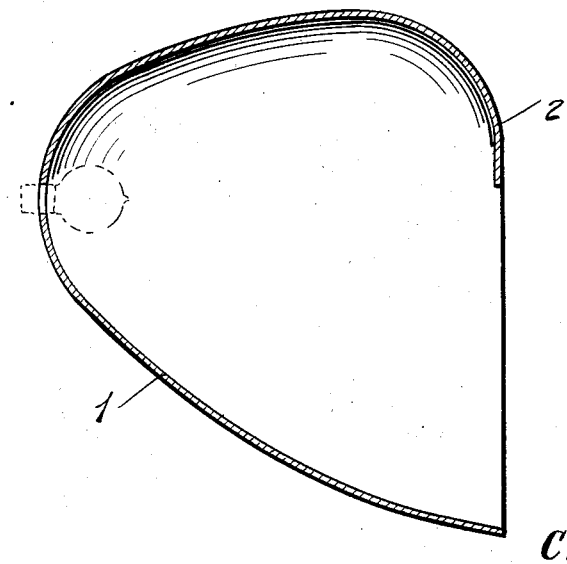
Figure 2 is a vertical longitudinal sectional view thereof on the line 2—2.

The reflector 1 is of parabolic formation and has its upper forward portion curved downwardly, as indicated at 2, whereby to provide a guard or shield which prevents the rays of light from being projected upwardly to the annoyance of a driver or person approaching in the opposite direction and which tends to temporarily blind and frequently is the source of a casualty. The provision of the guard or shield 2 in the manner indicated does not detract from the efficiency of the headlight in the illumination of the roadway ahead of the vehicle, but intercepts the upwardly projecting rays of light which would tend to blind the driver of a vehicle approaching in the opposite direction.

What is claimed is:

A headlight reflector made in a single piece of substantially the same thickness throughout, the reflector having a substantially round opening at the front thereof and a lamp hole at the rear thereof, said opening extending from the base of the reflector to a line substantially extending through the axis of said hole, the reflector extending upwardly and rearwardly along an unbroken curve directly from the front thereof, and the reflector curving downwardly and forwardly at its lower portion from the rear to said opening.

In testimony whereof I affix my signature.

CHARLES L. SAMS.